(No Model.)
C. H. DEMING.
MARTINGALE FOR PULLING HORSES.
No. 579,964. Patented Apr. 6, 1897.
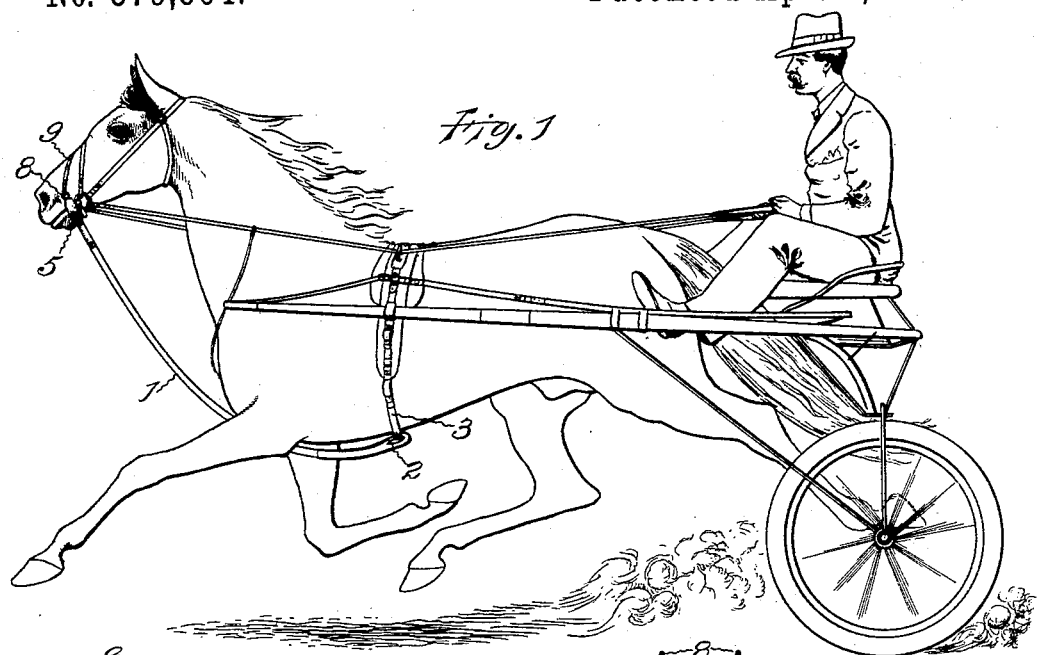
Fig. 1
Fig. 2
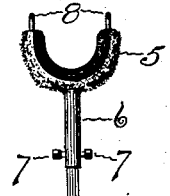
Fig. 3
Fig. 4
Witnesses:
E. J. Hyde
C. E. Buckland
Inventor:
Clifford H. Deming
by
Harry P. Williams
atty

UNITED STATES PATENT OFFICE.

CLIFFORD H. DEMING, OF GRANBY, CONNECTICUT.

MARTINGALE FOR PULLING HORSES.

SPECIFICATION forming part of Letters Patent No. 579,964, dated April 6, 1897.

Application filed July 20, 1896. Serial No. 599,795. (No model.)

*To all whom it may concern:*

Be it known that I, CLIFFORD H. DEMING, a citizen of the United States, residing at Granby, in the county of Hartford and State of Connecticut, have invented certain new and useful Improvements in Martingales for Pulling Horses, of which the following is a specification.

The invention relates to those devices which are adapted to be applied to the harnesses of horses that pull hard on the driving-reins when trotting, whereby they may be more easily controlled.

The object of the invention is to provide a simple and inexpensive device of this class which can be readily applied to the harness of any horse in such manner that the horse in the harness to which one is applied cannot drop his head or have it pulled down sufficiently to check off his wind and prevent his free breathing when being pulled to keep him within control.

To this end the invention resides in a light and comparatively stiff or but slightly-yielding curved rod, tube, or stick that at one end has means for connection with the girth or other strap of the harness below the barrel of the horse and at the other end has a curved bar, yoke, or fork for spanning the outside of the under jaw of the horse and straps for holding the bar or fork in position beneath the under jaw, as more particularly hereinafter described, and pointed out in the claim.

The invention is more particularly applicable for use in connection with horses trained for trotting races, and in the accompanying drawings—

Figure 1 is a view illustrating the invention in connection with such. Fig. 2 is an enlarged side view of the device. Fig. 3 is an edge view of the same, and Fig. 4 is a detail view of one end with a modified form of attaching-loop.

In the views, 1 indicates the main part of the device, which may be formed of a rod or tube of metal, a stick of wood, or a combination of both metal and wood, as is most convenient. This part may be circular, square, or any other shape in cross-section, and it may either be solid or hollow, as desired. The stick shown is formed of a solid piece of wood, round on the inside and flat on the outside and suitably curved to pass from beneath the barrel of the horse between the fore legs to the under jaw without interfering with the free movement of the leg, breast, and barrel muscles of the horse.

The lower end of the stick is provided with means whereby it may be connected with a girth or any other strap that passes around the body of the horse. This may be in the form of an eye 2, as shown in Figs. 1 and 2, and the girth 3 may be passed through the eye. It is preferred to cover this end of the stick with leather or other similar material to prevent any undue wear to the harness parts and also any liability of irritation incident to any chance chafing of the end of the stick against the skin of the horse.

If desired, the loop may be formed by riveting a strap 4 to the end of the stick, as shown in Fig. 4, or it may be simply a strap with a free end that is capable of being buckled or attached otherwise to any harness part. The upper end of this stick is provided with a curved bar, yoke, or fork 5. This may be formed of a bent metal rod that is adjustably attached to the end of the stick.

The fork may be provided with a shank 6, fitted to slip on the end of the stick and be held in place by set-screws 7 or any other clamping means. When the screws are loosened, the length of the device may be adjusted by slipping the shank of the fork along the stick to provide for horses of varying size. The ends of the fork have eyes 8, through which pass the straps 9, that hold the fork up beneath the under jaw. These straps may pass to the nose-piece of the harness or to an overdraw-check, or they may lead over the head back of the ears.

The fork is preferably bound with leather or lamb's wool to prevent chafing, and the inside may be padded, so that it will not bear harshly against the jaw.

The device is light in weight, simple and inexpensive to manufacture, and readily applicable to any harness on any horse. With the device in use the driver can pull as much as necessary for controlling the horse without causing the horse to drop his head or to allow it to be pulled down to such an extent that the neck will be sufficiently bent to check off the free passage of air to the lungs. The operation of the device is not harsh nor is its effect unpleasant, for the covered and padded bar or fork is loosely held under the jaw and the opposite end is loosely connected with the girth, and although the stick must be somewhat rigid in order to hold the head up it has enough spring incident to its curved shape to yield under sudden strains without causing a shock to the horse or in any way interfering with or impeding his gait.

The stick is stiff in order that it may be of some service, and yet it is made of resilient material, so that it will yield to any violent strain and not break or jam and bruise the horse. It is made curved for the purpose of permitting this stiff material to bend without breaking and without bruising the horse under any sudden shock, and also in order that it may pass between the legs of the horse and be secured to a harness part that is beneath the body. When secured to a harness part beneath the body in this manner, any violent pull or push on the stick is resisted by a harness part that passes around the body and that is usually especially arranged in such manner as to take strains of this nature without chafing the horse.

I claim as my invention—

As an improved article of manufacture, a martingale for horses consisting of a stiff bar of resilient material curved from end to end having at one end a padded fork adapted to extend beneath the lip of a horse, said fork being provided with eyes for attachment to a harness part adjacent to the bit, and having at the other end, which is adapted to pass beneath the body of the horse, an eye through which the girth-strap of a harness may be passed, substantially as specified.

CLIFFORD H. DEMING.

Witnesses:
H. R. WILLIAMS,
E. J. HYDE.